United States Patent
Rudrapatna et al.

(10) Patent No.: US 11,674,686 B2
(45) Date of Patent: Jun. 13, 2023

(54) COATING OCCLUSION RESISTANT EFFUSION COOLING HOLES FOR GAS TURBINE ENGINE

(71) Applicant: HONEYWELL INTERNATIONAL INC., Charlotte, NC (US)

(72) Inventors: Nagaraja Rudrapatna, Phoenix, AZ (US); Rodolphe Dudebout, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 46 days.

(21) Appl. No.: 17/317,589

(22) Filed: May 11, 2021

(65) Prior Publication Data
US 2022/0364727 A1    Nov. 17, 2022

(51) Int. Cl.
*F23R 3/00* (2006.01)
*F02C 7/18* (2006.01)

(52) U.S. Cl.
CPC ............... *F23R 3/002* (2013.01); *F02C 7/18* (2013.01); *F23R 2900/03041* (2013.01); *F23R 2900/03042* (2013.01)

(58) Field of Classification Search
CPC .... F02C 7/18; F05D 2220/32; F05D 2240/35; F05D 2260/202; F05D 2260/232; F23R 3/002; F23R 2900/03041; F23R 2900/03042
See application file for complete search history.

(56) References Cited

U.S. PATENT DOCUMENTS

| | | | |
|---|---|---|---|
| 4,705,455 A | 11/1987 | Sahm et al. |
| 5,771,577 A | 6/1998 | Gupta et al. |
| 6,383,602 B1 | 5/2002 | Fric et al. |
| 9,328,616 B2 | 5/2016 | Heselhaus |
| 9,422,815 B2 | 8/2016 | Xu |
| 9,696,035 B2 | 7/2017 | Starkweather et al. |

(Continued)

FOREIGN PATENT DOCUMENTS

| | | |
|---|---|---|
| EP | 0985802 B1 | 3/2000 |
| GB | 2438861 A | 12/2007 |

OTHER PUBLICATIONS

Simiriotis, Nikolaos, "Large Eddy Simulation of the Film Cooling Flow System of Turbine Blades: Public Shaped Holes," Department of Aerodynamics, Energetics and Propulsion, Sep. 2016.

*Primary Examiner* — Ehud Gartenberg
*Assistant Examiner* — Henry Ng
(74) *Attorney, Agent, or Firm* — Lorenz & Kopf LLP

(57) ABSTRACT

A coating occlusion resistant effusion cooling hole to form a film of a cooling fluid on a surface of a wall. The cooling hole extends along a longitudinal axis. The cooling hole includes an inlet section defined so as to be spaced apart from the surface. The inlet section is to receive the cooling fluid. The cooling hole includes a metering section fluidly coupled downstream of the inlet section. The cooling hole includes an outlet section fluidly coupled downstream of the metering section. The outlet section includes an overhang portion, a recessed portion, a first sidewall and a second sidewall. The first sidewall and the second sidewall interconnect the overhang portion with the recessed portion along a portion of the outlet section, and the first sidewall and the second sidewall converge and diverge in a plane transverse to the longitudinal axis.

18 Claims, 8 Drawing Sheets

(56) References Cited

U.S. PATENT DOCUMENTS

| | | |
|---|---|---|
| 9,696,036 B2 | 7/2017 | Clemen |
| 9,957,811 B2 | 5/2018 | Hucker et al. |
| 10,101,030 B2 | 10/2018 | Dudebout et al. |
| 10,215,030 B2 | 2/2019 | Xu |
| 10,822,958 B2 | 11/2020 | Wang et al. |
| 2010/0192588 A1 | 8/2010 | Gerendas |
| 2011/0293423 A1* | 12/2011 | Bunker .................. F01D 5/186 29/889 |
| 2013/0205790 A1* | 8/2013 | Xu .......................... F01D 5/186 415/116 |
| 2013/0205794 A1 | 8/2013 | Xu |
| 2013/0209234 A1 | 8/2013 | Xu |
| 2013/0259645 A1 | 10/2013 | Bergholz et al. |
| 2014/0161585 A1 | 6/2014 | Arness et al. |
| 2014/0338347 A1* | 11/2014 | Gage ...................... F23R 3/002 60/754 |
| 2015/0159871 A1* | 6/2015 | Pearson .................. F23R 3/002 60/754 |
| 2015/0226433 A1* | 8/2015 | Dudebout ............... F23R 3/002 60/752 |
| 2016/0061451 A1* | 3/2016 | Dudebout ................ F23R 3/04 60/755 |
| 2016/0069192 A1* | 3/2016 | Tanaka .................... B23H 9/10 416/232 |
| 2016/0076451 A1* | 3/2016 | McBrien ................ F23R 3/005 415/177 |
| 2016/0089692 A1 | 3/2016 | Reid et al. |
| 2016/0090843 A1 | 3/2016 | Albert et al. |
| 2016/0123156 A1* | 5/2016 | Hucker ................... F23R 3/005 60/752 |
| 2016/0245094 A1 | 8/2016 | Bunker et al. |
| 2016/0273364 A1* | 9/2016 | Bergholz ................ F01D 5/186 |
| 2017/0115006 A1* | 4/2017 | Sreekanth ............... F23R 3/005 |
| 2018/0010465 A1* | 1/2018 | Xu .......................... F01D 5/186 |
| 2018/0306114 A1 | 10/2018 | Dudebout et al. |
| 2020/0024951 A1 | 1/2020 | Herman et al. |
| 2020/0141579 A1 | 5/2020 | Sauer et al. |
| 2020/0166211 A1 | 5/2020 | Dudebout et al. |
| 2020/0378305 A1 | 12/2020 | Dudebout et al. |

* cited by examiner

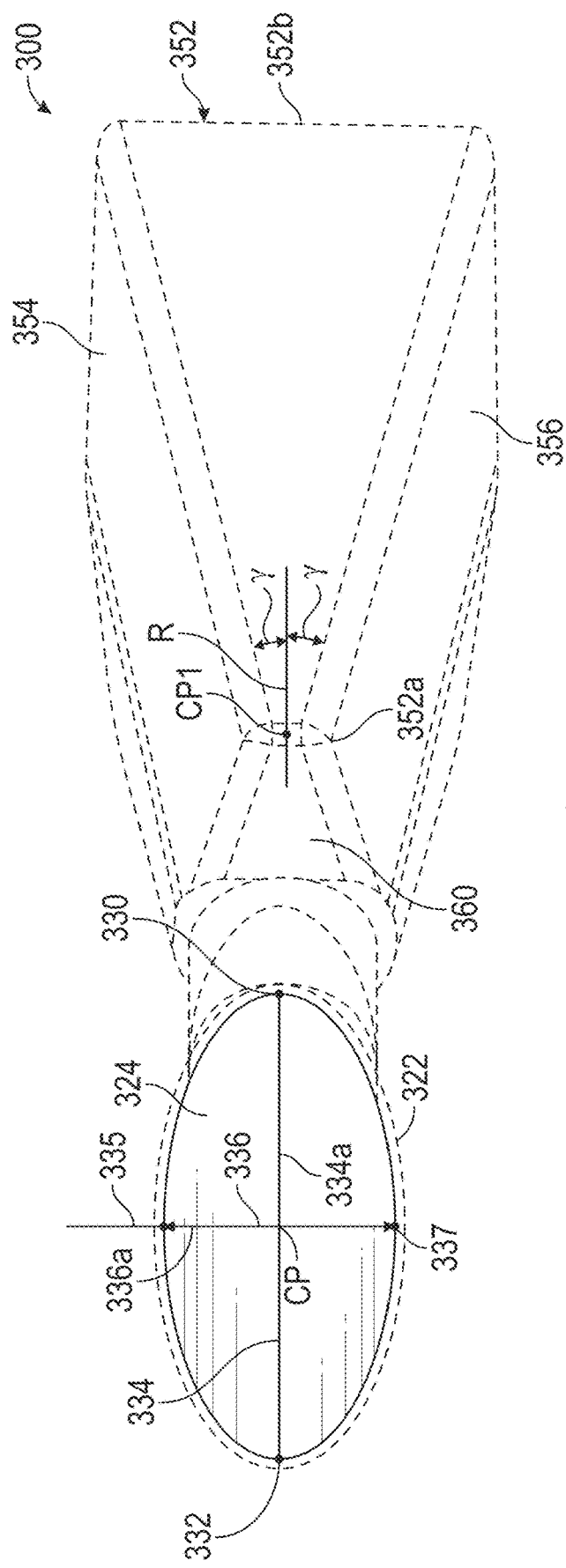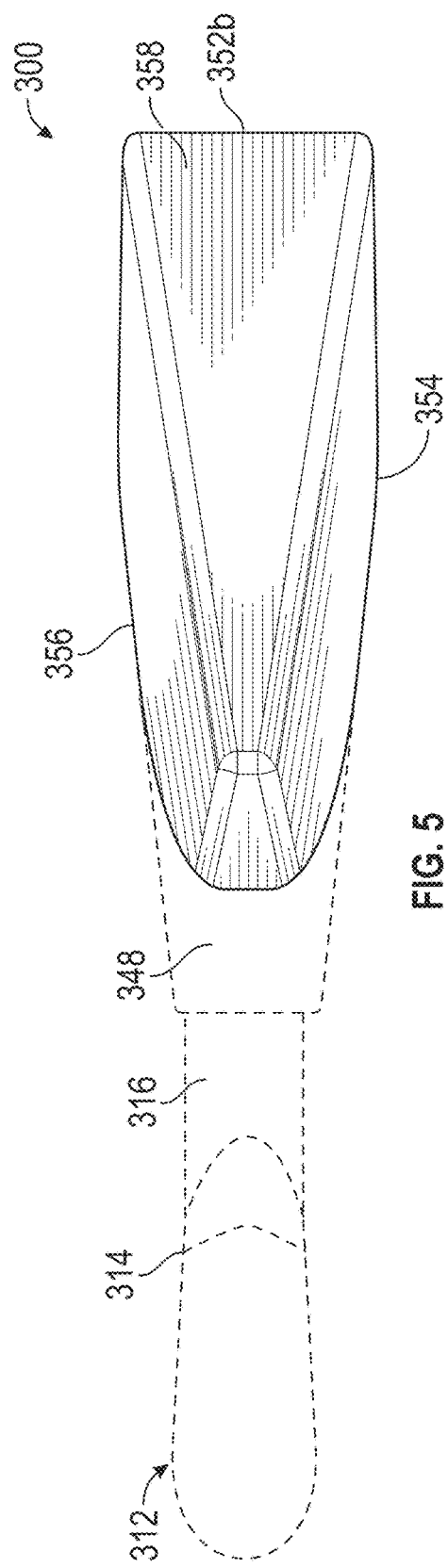
FIG. 4
FIG. 5

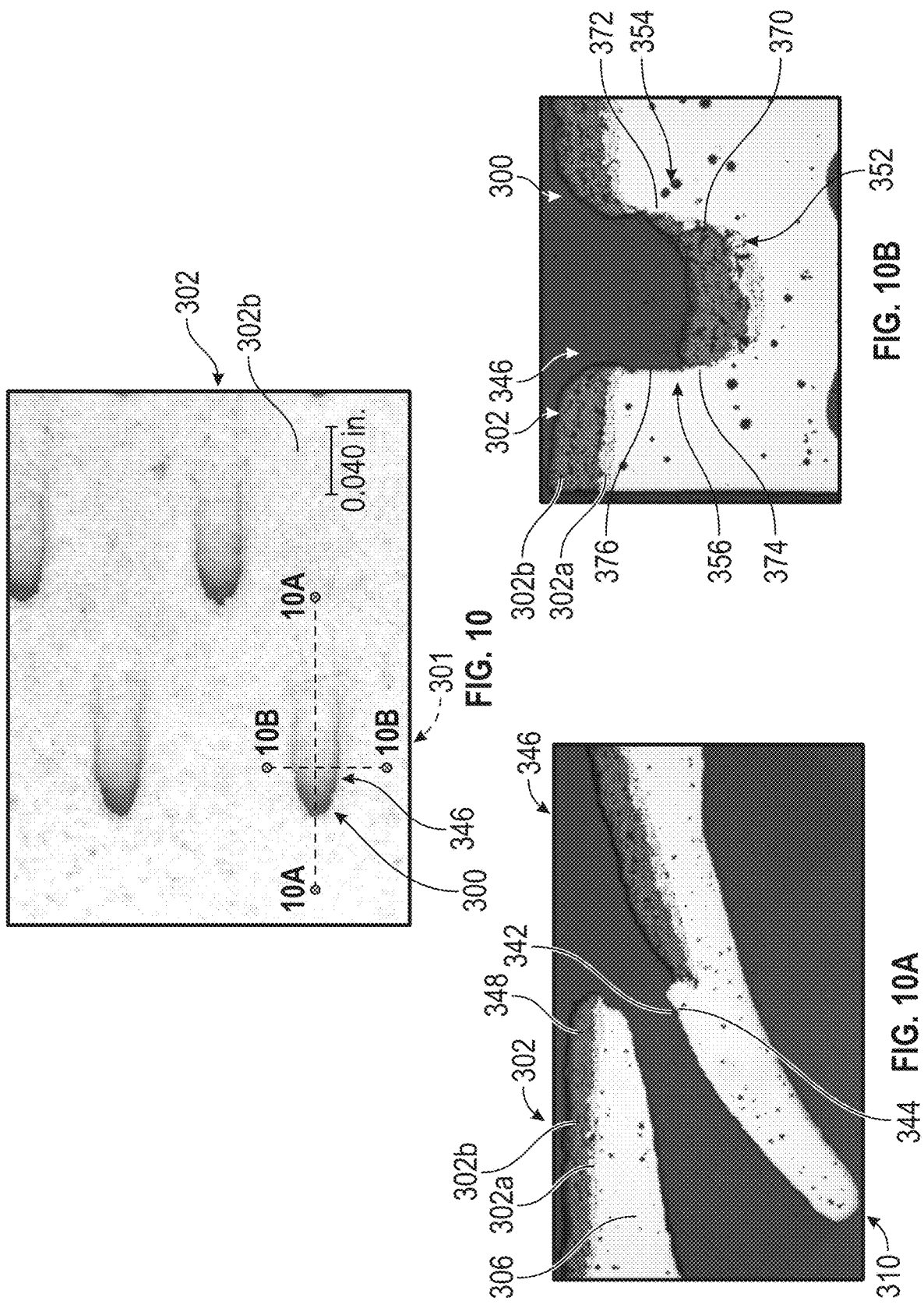

COATING OCCLUSION RESISTANT EFFUSION COOLING HOLES FOR GAS TURBINE ENGINE

STATEMENT REGARDING FEDERALLY SPONSORED RESEARCH OR DEVELOPMENT

This invention was made with Government support under W56HZV-12-C-0344 awarded by the U.S. Army. The Government has certain rights in the invention.

TECHNICAL FIELD

The present disclosure generally relates to gas turbine engines, and more particularly relates to coating occlusion resistant effusion cooling holes for a combustor of a gas turbine engine.

BACKGROUND

Gas turbine engines may be employed to power various devices. For example, a gas turbine engine may be employed to power a mobile platform, such as an aircraft. Generally, gas turbine engines have an engine core, in which gas is combusted to generate a hot combustive gas flow. Certain components of the gas turbine engine, such as the combustor liner, include portions that experience the full effect of the hot combustive gas flow. In order to regulate the temperature of these components, and therefore reduce the impact of the hot combustive gas flow, one or more cooling features may be employed. In addition, a thermal barrier coating may be applied to the combustor liner to provide further protection from the hot combustive gas flow. The application of the thermal barrier coating, however, may not be in a uniform direction, and in certain instances, the thermal barrier coating may inadvertently occlude or plug the cooling features.

Accordingly, it is desirable to provide a cooling feature, such as an effusion cooling hole, for a component of a gas turbine engine, such as a combustor liner of a combustor, which is resistant to occlusion during application of a thermal barrier coating. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a coating occlusion resistant effusion cooling hole configured to form a film of a cooling fluid on a surface of a wall. The coating occlusion resistant effusion cooling hole extends along a longitudinal axis. The coating occlusion resistant effusion cooling hole includes an inlet section defined so as to be spaced apart from the surface. The inlet section is configured to receive the cooling fluid. The coating occlusion resistant effusion cooling hole includes a metering section fluidly coupled downstream of the inlet section. The coating occlusion resistant effusion cooling hole includes an outlet section fluidly coupled downstream of the metering section. The outlet section is configured to form the film of the cooling fluid on the surface. The outlet section includes an overhang portion, a recessed portion, a first sidewall and a second sidewall. The first sidewall and the second sidewall interconnect the overhang portion with the recessed portion along a portion of the outlet section, and the first sidewall and the second sidewall converge and diverge in a plane transverse to the longitudinal axis.

The longitudinal axis is at an angle relative to the surface such that the overhang portion extends for the portion of the outlet section, and downstream of the overhang portion, the first sidewall and the second sidewall terminate at the surface. The outlet section includes an outlet inlet fluidly coupled to the metering section, and an outlet trough that includes the overhang portion and the recessed portion. The overhang portion is positioned opposite the recessed portion proximate the metering section, the recessed portion includes a rear wall that extends at a second angle away from the surface and a trough wall that is connected to the rear wall at a first wall end and is connected to the surface at a second wall end. The trough wall diverges outwardly relative to the longitudinal axis from the first wall end to the second wall end. Downstream of the overhang portion, a height of the first sidewall and the second sidewall changes such that proximate the second wall end, the first sidewall and the second sidewall diverge in the plane transverse to the longitudinal axis. The first sidewall and the second sidewall diverge proximate the recessed portion. The first sidewall and the second sidewall converge proximate the overhang portion. In the plane transverse to the longitudinal axis, a height of the first sidewall and the second sidewall decreases from proximate the overhang portion to an end of the outlet section such that proximate the end of the outlet section, the first sidewall and the second sidewall diverge. The coating occlusion resistant effusion cooling hole includes a ramp surface defined off of the wall and proximate the inlet section. The coating occlusion resistant effusion cooling hole includes a thermal barrier coating on the outlet section. The first sidewall and the second sidewall cooperate with the recessed portion to define a pocket to receive the thermal barrier coating. The coating occlusion resistant effusion cooling hole includes a converging section fluidly coupled downstream of the inlet section and fluidly coupled upstream from the metering section. The coating occlusion resistant effusion cooling hole is one of a plurality of coating occlusion resistant effusion cooling holes defined on a liner of a combustor for a gas turbine engine.

Also provided is a combustor for a gas turbine engine that includes a first liner having a first surface, a second surface opposite the first surface, and a wall having a thickness defined between the first surface and the second surface. The combustor includes a second liner forming a combustion chamber with the second side of the first liner, and the combustion chamber is configured to receive an air-fuel mixture for combustion. The first liner defines a plurality of coating occlusion resistant effusion cooling holes configured to form a film of a cooling fluid on the second surface of the first liner. At least one of the plurality of coating occlusion resistant effusion cooling holes extend along a longitudinal axis. The at least one of the plurality of coating occlusion resistant effusion cooling holes includes an inlet section spaced apart from the first surface, and a converging section fluidly coupled downstream of the inlet section. The at least one of the plurality of coating occlusion resistant effusion cooling holes includes a metering section fluidly coupled downstream of the converging section, with the metering section, the converging section and the inlet section is defined outside of the thickness of the wall. The at least one of the plurality of coating occlusion resistant effusion cooling holes includes an outlet section fluidly coupled downstream of the metering section. The outlet section is configured to form a film of cooling fluid on the second surface. The outlet section includes an overhang portion, a recessed portion, a first sidewall and a second sidewall, the first sidewall and the second sidewall interconnect the overhang portion with the recessed portion along a portion of the outlet section, and the first sidewall and the second sidewall converge and diverge in a plane transverse to the longitudinal axis.

The inlet section includes an opening and a bellmouth that surrounds the opening. The at least one of the plurality of coating occlusion resistant effusion cooling holes includes a ramp surface defined off of the wall and proximate the inlet section. The overhang portion extends for the portion of the outlet section, and downstream of the overhang portion, the first sidewall and the second sidewall terminate at the surface. The outlet section includes an outlet inlet fluidly coupled to the metering section, an outlet trough that includes the overhang portion and the recessed portion, the overhang portion is positioned opposite the recessed portion proximate the metering section, the recessed portion includes a rear wall that extends at an angle away from the surface and a trough wall that is connected to the rear wall at a first wall end and is connected to the surface at a second wall end, and the trough wall diverges outwardly relative to the longitudinal axis from the first wall end to the second wall end. The first sidewall and the second sidewall diverge proximate the recessed portion, and converge proximate the overhang portion. The combustor includes a thermal barrier coating on the surface and the outlet section of the at least one of the plurality of coating occlusion resistant effusion cooling holes, wherein the first sidewall and the second sidewall cooperate with the recessed portion to define a pocket to receive the thermal barrier coating.

DESCRIPTION OF THE DRAWINGS

The exemplary embodiments will hereinafter be described in conjunction with the following drawing figures, wherein like numerals denote like elements, and wherein:

FIG. 4 is a bottom view or a view from a cold surface associated with the combustor liner of the coating occlusion resistant effusion cooling hole of FIG. 3;

FIG. 5 is a top view or view from the hot surface associated with the combustor liner of the coating occlusion resistant effusion cooling hole of FIG. 3;

FIG. 10 is a photographic image of a portion of the combustion liner including the coating occlusion resistant effusion hole with a thermal barrier coating applied to the coating occlusion resistant effusion hole;

FIG. 10A is a photographic image of the coating occlusion resistant effusion hole with the applied thermal barrier coating taken along line 10A-10A of FIG. 10; and FIG. 10B is a photographic image of the coating occlusion resistant effusion hole with the applied thermal barrier coating taken along line 10B-10B of FIG. 10.

DETAILED DESCRIPTION

Figure 1:
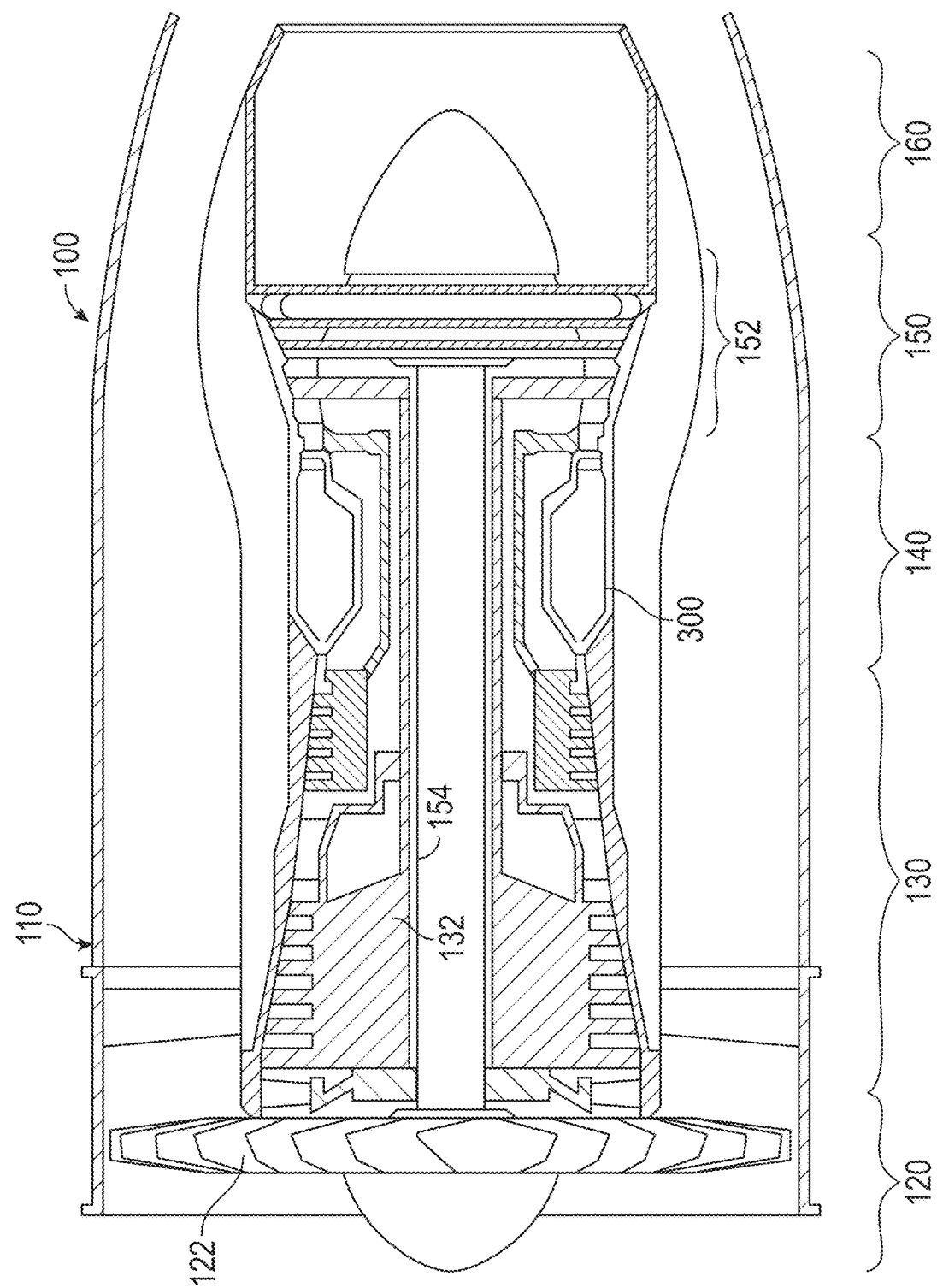
FIG. 1 is a schematic cross-sectional illustration of a gas turbine engine, which includes a combustion section having a plurality of exemplary coating occlusion resistant effusion cooling holes in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of component associated with a gas turbine engine that would benefit from having a coating occlusion resistant cooling feature, such as an effusion hole, and the coating occlusion resistant effusion cooling hole described herein for a combustor of a gas turbine engine is merely one exemplary embodiment according to the present disclosure. In addition, while the coating occlusion resistant effusion cooling hole is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

FIG. 1 is a simplified, cross-sectional view of a gas turbine engine 100 according to an exemplary embodiment. The gas turbine engine 100 may be disposed in an engine case 110 and may include a fan section 120, a compressor section 130, a combustor section 140, a turbine section 150, and an exhaust section 160. As will be discussed, the combustor section 140 includes one or more coating occlusion resistant effusion holes or effusion cooling holes 300, which provide cooling for a portion of the combustor section 140 while reducing plugging or occlusion of the effusion cooling holes 300 during the application of a coating, such as a thermal barrier coating. By providing the effusion cooling holes 300, the temperature of the portion of the combustor section 140 is regulated, which improves useful life and reduces maintenance costs.

With continued reference to FIG. 1, the fan section 120 may include a fan 122, which draws in and accelerates at least a portion of the air into the compressor section 130. The compressor section 130 may include a series of compressors 132 that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through the exhaust section 160. In one embodiment, the turbines 152 rotate to drive equipment in the gas turbine engine 100 via concentrically disposed shafts or spools. Specifically, the turbines 152 may drive the compressors 132 via one or more shafts 154. FIG. 1 depicts one exemplary configuration, and other embodiments may have alternate arrangements. The exemplary embodiments discussed herein are not limited to use in conjunction with a particular type of turbine engine.

Figure 2:
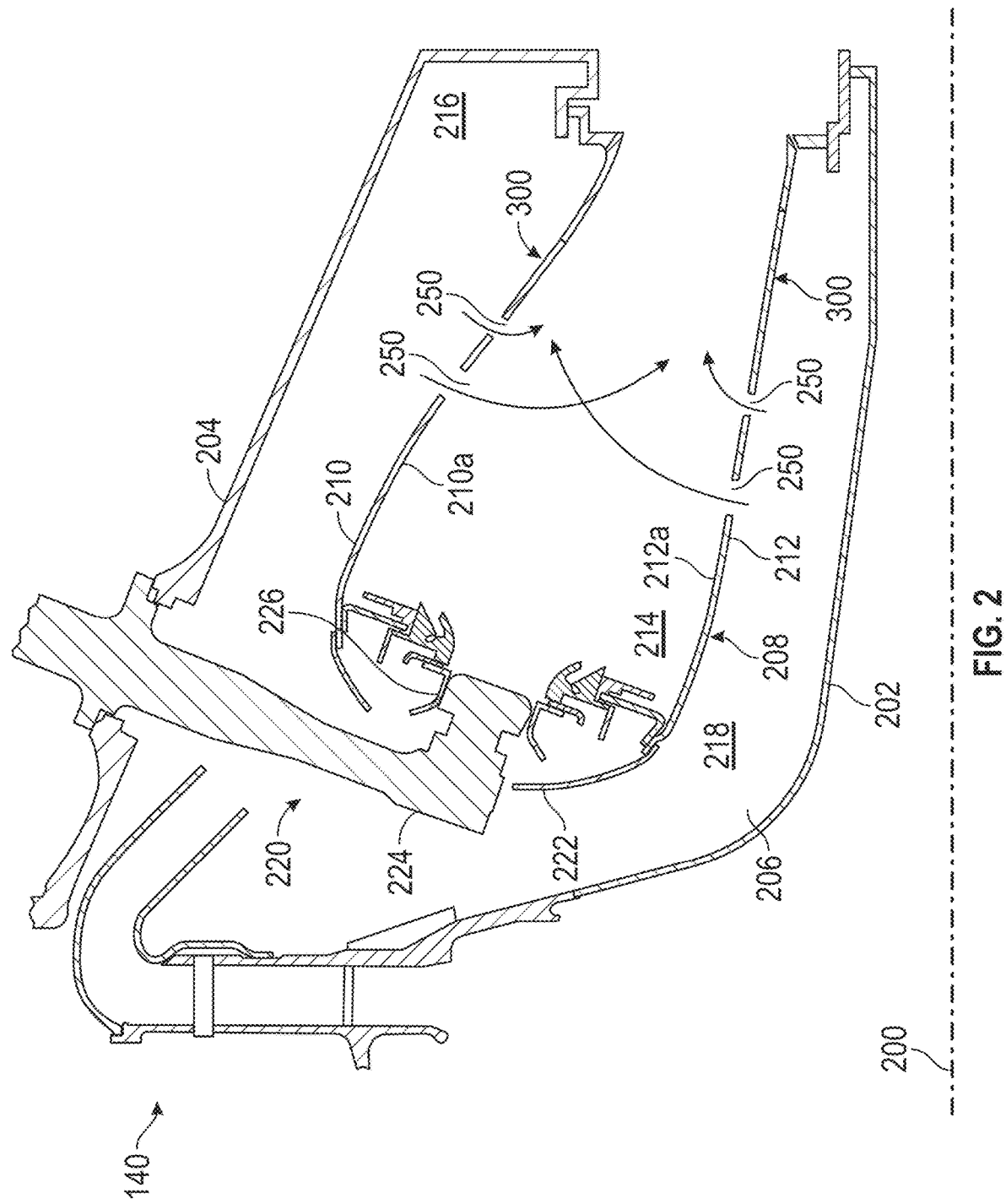
FIG. 2 is a partial cross-sectional view of the combustion section of FIG. 1, which includes the plurality of coating occlusion resistant effusion cooling holes, in accordance with various embodiments.

FIG. 2 is a more detailed cross-sectional view of the combustor section 140 of FIG. 1. In FIG. 2, only half the cross-sectional view is shown; the other half would be substantially rotationally symmetric about a centerline and axis of rotation 200. The combustor section 140 of FIG. 2 is an annular combustor section 140, although aspects of exemplary embodiments described herein may also be useful in can combustors, can-annular combustors, and other types of combustors. Exemplary embodiments are applicable to both commercial and military gas turbine engines and auxiliary power units. Moreover, as mentioned previously, exemplary embodiments may find beneficial uses in many industries, including aerospace and particularly in high performance aircraft, as well as automotive, marine and power generation.

The combustor section 140 includes a radially inner case 202 and a radially outer case 204 concentrically arranged with respect to the inner case 202. The inner and outer cases 202, 204 circumscribe the axially extending engine centerline or axis of rotation 200 to define an annular pressure vessel 206. The combustor section 140 also includes a combustor 208 residing within the annular pressure vessel 206. The combustor 208 is defined by an outer combustor liner 210 and an inner combustor liner 212 that is circumscribed by the outer combustor liner 210 to define an annular combustion chamber 214. The outer and inner combustor liners 210, 212 cooperate with cases 202, 204 to define respective outer and inner air plenums 216, 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2, although a number of fuel injectors 224 may be disposed about the combustor 208. Each fuel injector 224 introduces a swirling, intimately blended fuel-air mixture that supports combustion in the combustion chamber 214.

In one exemplary embodiment, the combustor 208 may be a rich burn, quick quench, lean burn (RQL) combustor, although further exemplary embodiments may provide other types of combustion processes. During operation, a portion of the pressurized air enters the combustion chamber 214 by way of passages in the front end assembly 220. The air is intermixed with fuel introduced through the fuel injectors 224 and ignited by an igniter (not shown) to support initial combustion. Additional air for further combustion flows from the air plenum 216, 218 into the combustion chamber 214 through air admission holes 250 in the outer and inner combustor liner 210, 212. Two rows of air admission holes 250 are depicted in FIG. 2, although other arrangements may be provided. As noted above, the resulting combustion gases exit the combustion chamber 214 and are directed to the turbine section for energy extraction.

As also noted above, the engine components are subject to extremely high temperatures resulting from the combustion process. If unaddressed, the extreme heat may affect the useful life of components and/or impact the maximum operating temperature of the engine. As such, cooling features and/or mechanisms may be provided to maintain temperatures at acceptable levels. As will be discussed, a thermal barrier coating 302 (FIG. 3) along with the effusion cooling holes 300 are examples of features that maintain temperatures of the outer and inner combustor liner 210, 212 at acceptable levels.

In one example, the effusion cooling holes 300 are relatively small, closely spaced holes formed in various engine components, including one or both of the outer and inner combustor liners 210, 212. In this example, the effusion cooling holes 300 are defined within the outer and inner combustor liners 210, 212 to provide cooling to the outer and inner combustor liners 210, 212. The effusion cooling holes 300 may also be referred to as "angled cooling holes." These effusion cooling holes 300 serve to direct a flow of relatively cool air from the air plenums 216, 218, through the outer and inner combustor liner 210, 212, and onto an inner surface 210a, 212a of the outer and inner combustor liner 210, 212, respectively, to form a film of cool air on the inner surface 210a, 212a to protect the inner surface 210a, 212a from the hot combustive gases.

Figure 3:
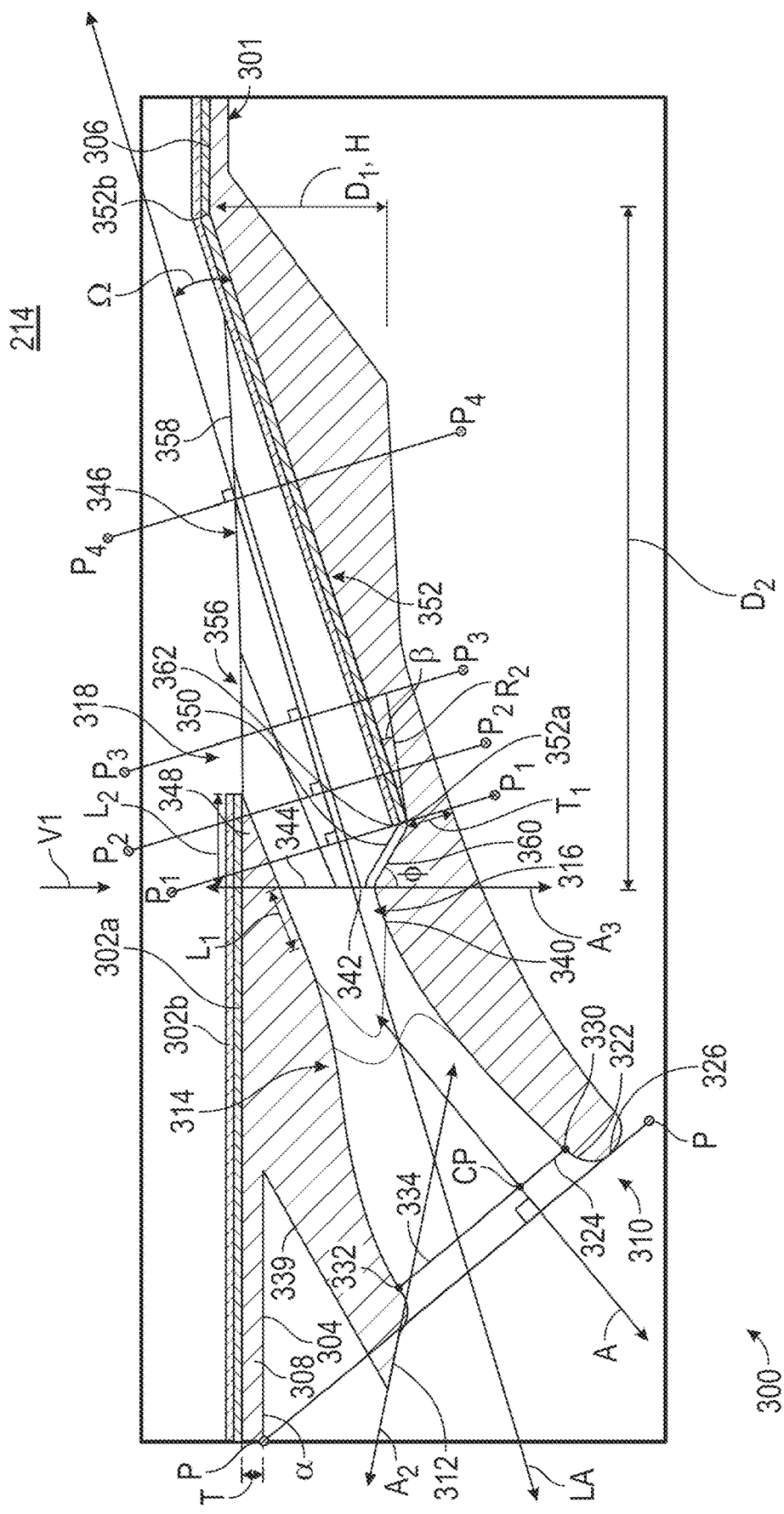
FIG. 3 is a cross-sectional view of one of the coating occlusion resistant effusion cooling holes associated with an exemplary combustor liner of the combustion section of FIG. 2 in accordance with various embodiments.

With reference to FIG. 3, in one example, the effusion cooling holes 300 are angled at about 10 degrees to about 55 degrees (for example, about 20 degrees) to the inner surface 210a, 212a of the outer and inner combustor liner 210, 212, and may be oriented to discharge at various angles relative to the bulk combustor gas flow, such that a film of cooling air forms on the inner surface 210a, 212a of the respective outer and inner combustor liner 210, 212, e.g., the surface facing the combustion chamber 214. The film of cooling air functions to protect the outer and inner combustor liner 210, 212 from the elevated temperatures of the combustion gases. Effusion cooling may also be used in other components, including combustor domes, heat shields, and turbine components, and the effusion (or angled) cooling holes 300 discussed herein are applicable to those components, e.g., the effusion cooling holes 300 may be associated with the body of such components exposed to combustion gases to direct cooling air from a first surface, through the body, and to a second surface to form a film of cooling air over the respective component. Thus, while the effusion cooling holes 300 are described and illustrated herein as being used with a combustor, such as the combustor 208, the effusion cooling holes 300 may be employed with any suitable engine component that would benefit from the coating occlusion resistant effusion cooling holes, and the use of the effusion cooling holes 300 with the combustor 208 is merely an example.

The shape of the effusion cooling holes 300 reduces or eliminates the plugging of the effusion cooling holes 300 with the thermal barrier coating 302, while also ensuring a sufficient supply of cooling fluid through the effusion cooling holes 300. Moreover, the effusion cooling holes 300 are shaped to enable the thermal barrier coating 302 to be evenly applied to the effusion cooling holes 300, which ensures adequate cooling of the outer and inner combustor liner 210, 212. As discussed, the effusion cooling holes 300 each receive cooling fluid or air from a cooling fluid source associated with the gas turbine engine 100, such as the air plenums 216, 218, for example.

FIG. 3 is a cross-sectional view of one of the effusion cooling holes 300 associated with a combustor liner 301. The combustor liner 301 may correspond, as an example, to any portion of the outer or inner combustor liner 210, 212 of the combustor 208 of FIG. 2. In this example, the combustor liner 301 includes a first or cold surface 304 and an opposite second or hot surface 306. The combustor liner 301 may also have a thickness T defined between the cold surface 304 and the hot surface 306. In one example, the thickness T is about 0.020 inches to about 0.070 inches, and for example, about 0.040 inches. The thickness T defines an interior or wall 308 of the combustor liner 301. Stated another way, the wall 308 is defined and extends between the hot surface 306 and the cold surface 304. In one example, each of the effusion cooling holes 300 is defined only partially through the wall 308 of the combustor liner 301, with a portion of each of the effusion cooling holes 300 extending above the cold surface 304. In other words, a portion of each of the effusion cooling holes 300 is defined outside of the thickness T of the wall 308 and is positioned above the cold surface 304 such that the portion of the effusion cooling holes 300 is not defined within the thickness T of the wall 308.

It should be understood that each of the effusion cooling holes 300 associated with the combustor liner 301 is the same, and for ease of description a single one of the effusion cooling holes 300 will be described and illustrated herein. In this example, the effusion cooling hole 300 includes an inlet section 310, a ramp surface 312 proximate the inlet section 310, a converging section 314, a metering section 316, and an outlet section 318. Additional portions or segments may be provided as necessary or desired. The effusion cooling hole 300 extends along a longitudinal axis LA, which is oblique to the cold surface 304. In this example, the longitudinal axis LA is at an angle Ω of about 20 degrees relative to the hot surface 306 to form the angled effusion cooling hole 300.

In one example, the inlet section 310, the ramp surface 312, the converging section 314, the metering section 316 and a portion of the outlet section 318 are defined so as to be positioned exterior to or above the cold surface 304 of the combustor liner 301. Stated another way, the inlet section 310, the ramp surface 312, the converging section 314, the metering section 316 and a portion of the outlet section 318 are defined exterior of the wall 308 and outside of the thickness T of the wall 308. By defining the inlet section 310, the ramp surface 312, the converging section 314, the metering section 316, and a portion of the outlet section 318 outside of the wall 308, outside of the thickness T and exterior to the cold surface 304 of the combustor liner 301, the inlet section 310, the ramp surface 312, the converging section 314, the metering section 316 and a portion of the outlet section 318 may act as heat transfer fins, which further assist in cooling the combustor liner 301.

The inlet section 310 guides cooling fluid or air into the effusion cooling hole 300 and is spaced apart from the cold surface 304. The inlet section 310 is defined exterior to the wall 308, which enables a reduction in the thickness T. In one example, the inlet section 310 includes a bellmouth 322 and defines an opening 324. The inlet section 310 also includes a fillet 326. The bellmouth 322 is defined about and surrounds the opening 324. The bellmouth 322 assists in directing cooling fluid or air into the opening 324. The bellmouth 322 defines a raised surface that is a heat transfer device and also assists in cooling the combustor liner 301. The bellmouth 322 and the opening 324 are each defined so as to be asymmetrical with regard to the longitudinal axis LA. In one example, the bellmouth 322 and the opening 324 are defined along an axis A, which is oblique to the longitudinal axis LA. Generally, the bellmouth 322 and the opening 324 are defined along the axis A to accommodate and cooperate with the ramp surface 312, and to receive cooling fluid or air that has encountered the ramp surface 312. The axis A is spaced a distance above the cold surface 304, and in this example, the distance is about 0.02 inches (in.) to about 0.10 inches (in.), and for example, is about 0.06 inches (in.).

In one example, the opening 324 is elliptical in shape. The elliptical shape of the opening 324 enables the inlet section 310 to be as large as possible for a given area and density of the effusion cooling holes 300 on the combustor liner 301. The elliptical opening 324 also allows a large inlet area while enabling adjacent effusion cooling holes 300 to be situated more closely on the combustor liner 301, which enables the combustor liner 301 to be formed with a higher cooling density. By positioning the opening 324 off of the cold surface 304 and exterior to the wall 308, the thickness T of the combustor liner 301 may be reduced in between the effusion cooling holes 300 in order to reduce the weight and material associated with the combustor liner 301. In addition, the positioning of the opening 324 off of the cold surface 304 and exterior to the wall 308 further enables a cross-sectional area of the opening 324 to be increased.

In this regard, the opening 324 has a first vertex 330 distalmost from the cold surface 304, and has a second vertex 332, opposite the first vertex 330. The second vertex 332 is proximate the ramp surface 312. A major axis 334 of the opening 324 is defined between the two vertices 330, 332. A semi-major axis is defined between a center point CP and the first vertex 330; and a semi-major axis is defined between the center point CP and the second vertex 332. With reference to FIG. 4, the opening 324 also includes a third vertex 335 opposite a fourth vertex 337. A minor axis 336 is defined between the vertices 335, 337. The minor axis 336 includes a semi-minor axis that extends between the center point CP and the third vertex 335; and a second semi-minor axis that extends between the center point CP and the fourth vertex 337. With reference to FIG. 3, the orientation of the major axis 334 as oblique to the cold surface 304 provides for increased airflow into the opening 324. In one example, the major axis 334 is orientated at about 45 degrees relative to the cold surface 304. A cross-sectional area of the opening 324 is the product of the semi-major axis 334a (FIG. 4), the semi-minor axis 336a (FIG. 4) and pi, which in one example, is about 0.0012 square inches ($in^2$) to about 0.0028 square inches ($in^2$). Generally, a cross-sectional area of the opening 324 is about twice a cross-sectional area of the metering section 316. In other examples, the cross-sectional area of the opening 324 is about four times the cross-sectional area of the metering section 316.

The elliptical shape of the opening 324 also directs the cooling fluid or air along a center of the effusion cooling hole 300. Generally, the inlet section 310, including the bellmouth 322 and the opening 324, is orientated such that an inlet plane P defined through the inlet section 310 and normal to the axis A is at an angle α relative to the cold surface 304. In one example, a is approximately 45 degrees in order to form a self-supported surface during additive manufacturing of the combustor liner 301. In the example of additive manufacturing, the build orientation of the combustor liner 301 is such that the bellmouth 322 of the inlet section 310 is on the bottom of the build.

The fillet 326 extends about a perimeter of the effusion cooling hole 300 that extends beyond the cold surface 304 so as to surround the portion of the effusion cooling hole 300 that is external to the cold surface 304 and the wall 308. The fillet 326 is defined along the interface of the cold surface 304 and the effusion cooling hole 300, and extends about an entirety of the perimeter of the effusion cooling hole 300 at the interface with the cold surface 304. The fillet 326 is generally concave, and in one example, the fillet 326 has a radius of curvature of about 0.005 inches to about 0.015 inches, and in one example, the fillet 326 is about 0.010 inches. The fillet 326 assists in the manufacturing of the effusion cooling hole 300 by providing an underlying structure for the building of the effusion cooling hole 300 through additive manufacturing. The fillet 326 also constrains thermal stresses as a thermal gradient may exists through the effusion cooling hole 300 and around the inlet section 310. A portion of the fillet 326 is defined adjacent to the cold surface 304 and transitions into the ramp surface 312.

The ramp surface 312 is defined proximate to the bellmouth 322 and the fillet 326. The ramp surface 312 is defined off of or exterior to the cold surface 304 and the thickness T of the wall 308. The ramp surface 312 is proximate to the inlet section 310 and is upstream from the bellmouth 322 and the opening 324 to promote flow separation from the cold surface 304. Generally, the ramp surface 312 extends along an axis A2 transverse to the axis A and the longitudinal axis LA, and transitions into the bellmouth 322. The ramp surface 312 generally results from thinning the cold surface 304 in-between the effusion cooling holes 300 in order to reduce weight, which results in a surface 339 that extends beyond the thickness T of the wall 308 and along an axis that is transverse to the axis A2. The ramp surface 312 also serves to provide a uniform inlet condition at the bellmouth 322, along the inlet plane P that is normal to the axis A. The ramp surface 312 generally provides for a smooth flow entrance into the opening 324.

The converging section 314 is downstream of the inlet section 310. The converging section 314 is defined exterior to the wall 308, which also enables the reduction in the thickness T. The converging section 314 extends between the inlet section 310 and the metering section 316. The converging section 314 provides a smooth surface which is devoid of sharp edges to direct the cooling fluid or air into the metering section 316. Generally, the converging section 314 transitions from an elliptical shape proximate the opening 324 to a circular shape proximate the metering section 316. In one example, the converging section 314 has a generally continuous reduction in cross-sectional area from the opening 324 to the metering section 316. For example, a cross-sectional area of the converging section 314 proximate the opening 324 is different, and greater than, a cross-sectional area of the converging section 314 proximate the metering section 316. The converging section 314 smoothly transitions or is devoid of bumps or protuberances from the first cross-sectional area to the second cross-sectional area. It should be noted that the converging section 314 may have local increases or decreases in cross-section, if desired. Further, it should be noted that the converging section 314 may have some inflections or may not be smooth as the converging section 314 transitions from the inlet section 310 to the metering section 316. In this example, a second derivative of each unit length is continuous in the converging section 314 and every surface is pure tangent to an adjacent surface within the converging section 314.

The metering section 316 is downstream of the converging section 314. The metering section 316 is generally cylindrical, with a circular cross-section, and is substantially symmetric to the longitudinal axis LA. The metering section 316 includes a metering inlet 340 upstream from a metering outlet 342. The metering inlet 340 is spaced apart from the metering outlet 342 by a length L1. In one example, the length L1 is about 0.020 inches to about 0.050 inches long, and for example, is about 0.040 inches long. Generally, the metering inlet 340 is in fluid communication with the converging section 314, and the metering outlet 342 is in fluid communication with the outlet section 318. The metering inlet 340 and the metering outlet 342 are each defined exterior to the cold surface 304 and the wall 308. By providing the metering section 316 outside of or external to the cold surface 304 and the wall 308, the thickness T of the wall 308 may be reduced.

The outlet section 318 is downstream of the metering section 316 and is in fluid communication with the metering outlet 342. The outlet section 318 includes an outlet inlet 344 and an outlet trough 346. The outlet inlet 344 is circular, and is in fluid communication with the metering outlet 342. With reference to FIG. 5, the outlet trough 346 dispenses the cooling fluid or air onto the hot surface 306 of the combustor liner 301. In one example, with reference back to FIG. 3, the outlet trough 346 is defined to provide the effusion cooling hole 300 with a minimum wall thickness T1 of about 0.010 inches to about 0.030 inches, and for example, about 0.020 inches. The outlet trough 346 includes an overhang portion 348 proximate the hot surface 306, a recessed portion 350 that includes a trough wall 352 proximate the cold surface 304 that extends to the hot surface 306, and opposed sidewalls 354, 356 that interconnect the overhang portion 348 with the trough wall 352 along a portion of the outlet section 318. The outlet 358 for the effusion cooling hole 300 is defined between the overhang portion 348 and a second wall end or second end 352b of the trough wall 352 (FIG. 5).

In this example, a length L2 of the outlet section 318 is defined within or by the wall 308 and forms the overhang portion 348. In one example, L2 is about 0.005 inches to about 0.030 inches, and in one example, is about 0.010 inches. The overhang portion 348 ensures that the metering outlet 342 and the outlet inlet 344 are not obstructed or occluded by the application of the thermal barrier coating 302. In this example, the overhang portion 348 is defined so as to be planar with the hot surface 306, but in other examples, the overhang portion 348 may be angled relative to the hot surface 306. Generally, the overhang portion 348 extends for the length L2 that is predetermined for the overhang portion 348 to extend over the outlet inlet 344 and a portion of the recessed portion 350. Thus, the overhang portion 348 extends for a portion of the outlet section 318.

The recessed portion 350 is a portion of the outlet trough 346 that is indented away from the hot surface 306. The cooling fluid or air received through the inlet section 310, the converging section 314, and the metering section 316 exits into the recessed portion 350. In one example, the recessed portion 350 includes a rear wall 360 and the trough wall 352. The rear wall 360 is defined at an angle φ relative to an axis A3 defined through the metering outlet 342 such that an entirety of the rear wall 360 is angled relative to the hot surface 306. The axis A3 is transverse or oblique to the longitudinal axis LA. In one example, the angle φ is about 20 to about 30 degrees, and in this example, is about 25 degrees. The angle φ results in the rear wall 360 being angled forward or toward the hot surface 306. By defining the rear wall 360 at the angle φ, the rear wall 360 cooperates with the sidewalls 354, 356 to define a pocket 362 about the outlet inlet 344, which assists in retaining the thermal barrier coating 302 within the outlet trough 346. In addition, the angle φ of the rear wall 360 results in the pocket 362 having a varying depth, which further assists in the adherence of the thermal barrier coating 302 about the pocket 362. The rear wall 360 extends a distance D1 in the inward direction from the hot surface 306.

The trough wall 352 is coupled or connected to the rear wall 360 and extends from the rear wall 360 to the hot surface 306. In one example, with reference to FIG. 4, the trough wall 352 diverges from a first wall end or first end 352a to the second end 352b, which is opposite the first end 352a. The first end 352a is connected to the rear wall 360, and the second end 352b is at the hot surface 306. In one example, the trough wall 352 diverges at an angle γ, which is about 3 degrees to 13 degrees. In this example, angle γ is about 7 degrees. The angle γ is defined between a reference line R that extends through a center point CP1 defined at the intersection of the trough wall 352 and the rear wall 360, and the respective sidewall 354, 356. It should be noted that while in this example, the angle γ is the same between both sidewalls 354, 356, such that the divergence of the trough wall 352 is uniform, in other examples, the divergence of the trough wall 352 may not be the uniform or the angle γ may not be the same between each of the sidewalls 354, 356.

With reference back to FIG. 3, the trough wall 352 also extends at an angle β relative to a reference line R2 that is parallel to the hot surface 306. The angle β is predetermined so that the second end 352b terminates at the hot surface 306. In one example, the angle β is about 20 degrees to about 70 degrees, such as about 30 degrees to about 60 degrees. The trough wall 352 spans a distance D2 from the rear wall 360 to the hot surface 306. The distance D2 is different than the distance D1, and the distance D1 may be from about 20 percent to about 80 percent of distance D2, such as from about 30 percent to about 70 percent.

Figure 3B:
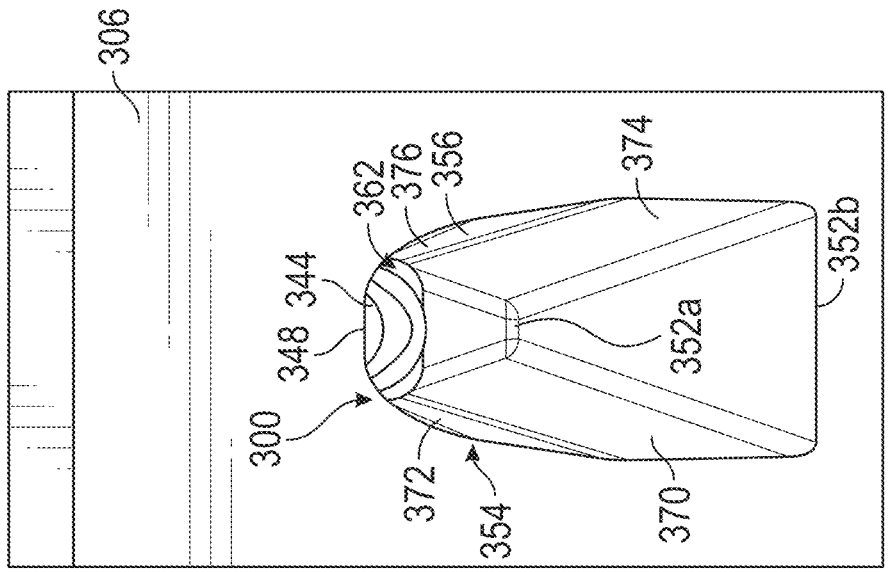
FIG. 3B is a top view of the coating occlusion resistant effusion cooling hole of FIG. 3 taken from the hot surface associated with the combustor liner.
Figure 3A:
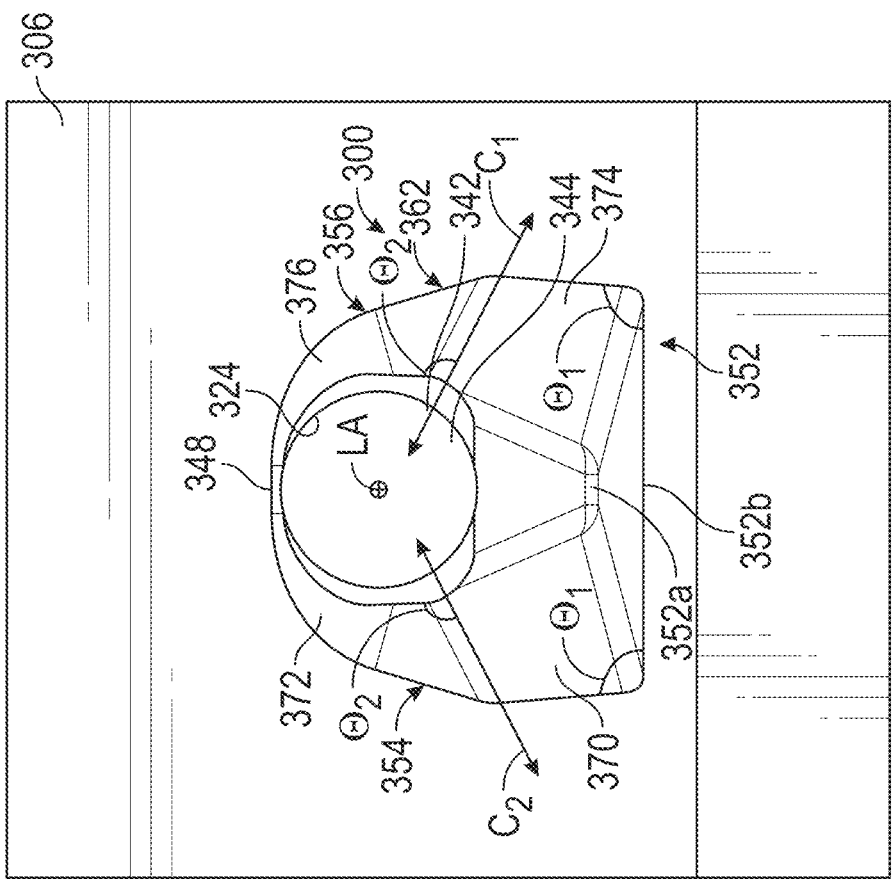
FIG. 3A is a front view of the coating occlusion resistant effusion cooling hole of FIG. 3 taken from a hot surface associated with the combustor liner.

The sidewall 354 is opposite the sidewall 356, and the sidewalls 354, 356 interconnect the overhang portion 348 with the recessed portion 350 along a portion of the outlet section 318, as shown in FIG. 3A. In one example, the sidewalls 354, 356 are continuous, and diverge and converge in a direction transverse or normal to the longitudinal axis LA. By diverging and converging in the direction transverse or normal to the longitudinal axis LA, with additional reference to FIG. 3B, the sidewalls 354, 356 cooperate with the recessed portion 350 to define the pocket 362 to receive the thermal barrier coating 302 about the outlet inlet 344 without occluding the metering outlet 342 or outlet inlet 344 (See also FIGS. 10A and 10B). In addition, the converging and diverging of the sidewalls 354, 356 in the direction normal to the longitudinal axis LA ensures that the thermal barrier coating 302 is evenly distributed about the circumference of the metering outlet 342 and the outlet inlet 344 (FIG. 10B). Thus, generally, the sidewalls 354, 356 provide a surface profile that is conducive for receiving the thermal barrier coating 302.

Figure 6:
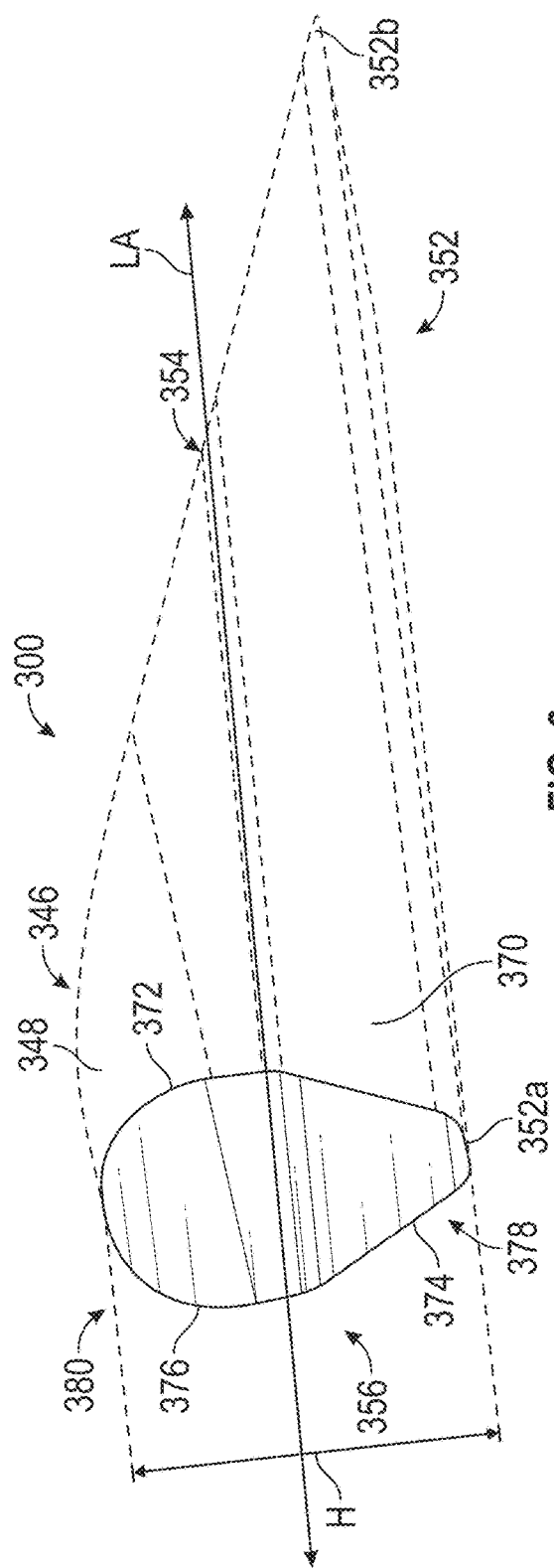
FIG. 6 is a perspective view of a cross-section of an outlet trough of the coating occlusion resistant effusion hole of FIG. 3, taken along a first plane transverse or normal to a longitudinal axis of the coating occlusion resistant effusion hole.

In this example, with reference to FIG. 3, a first plane P1 is transverse or normal to the longitudinal axis LA and is taken through the outlet trough 346 at the intersection of the rear wall 360 with the trough wall 352. With reference to FIG. 6, a view of the cross-section of the effusion cooling hole 300 along the first plane P1 is shown. As shown in FIG. 6, the sidewall 354 includes a first section 370 and a second section 372; and the sidewall 356 includes a third section 374 and a fourth section 376. The first section 370 and the third section 374 diverge away from each other and away from the trough wall 352 to form a divergent section 378 of the sidewalls 354, 356. With reference to FIG. 3A, the first section 370 and the third section 374 diverge away from the trough wall 352 at an angle θ1, which in this example is greater than 90 degrees. With reference back to FIG. 6, the second section 372 and the fourth section 376 converge toward each other and toward the overhang portion 348 to form a convergent section 380 of the sidewalls 354, 356. As shown in FIG. 6, the second section 372 and the fourth section 376 of the convergent section 380 curve toward the overhang portion 348. With reference to FIG. 3A, the second section 372 converges at an angle θ2, which in this example is less than 90 degrees, relative an axis of convergence C1. The axis of convergence C1 is defined at the interface of the first section 370 and the second section 372. The fourth section 376 converges at the angle θ2, which is less than 90 degrees, relative an axis of convergence C2. The axis of convergence C2 is defined at the interface of the third section 374 and the fourth section 376.

Figure 7:
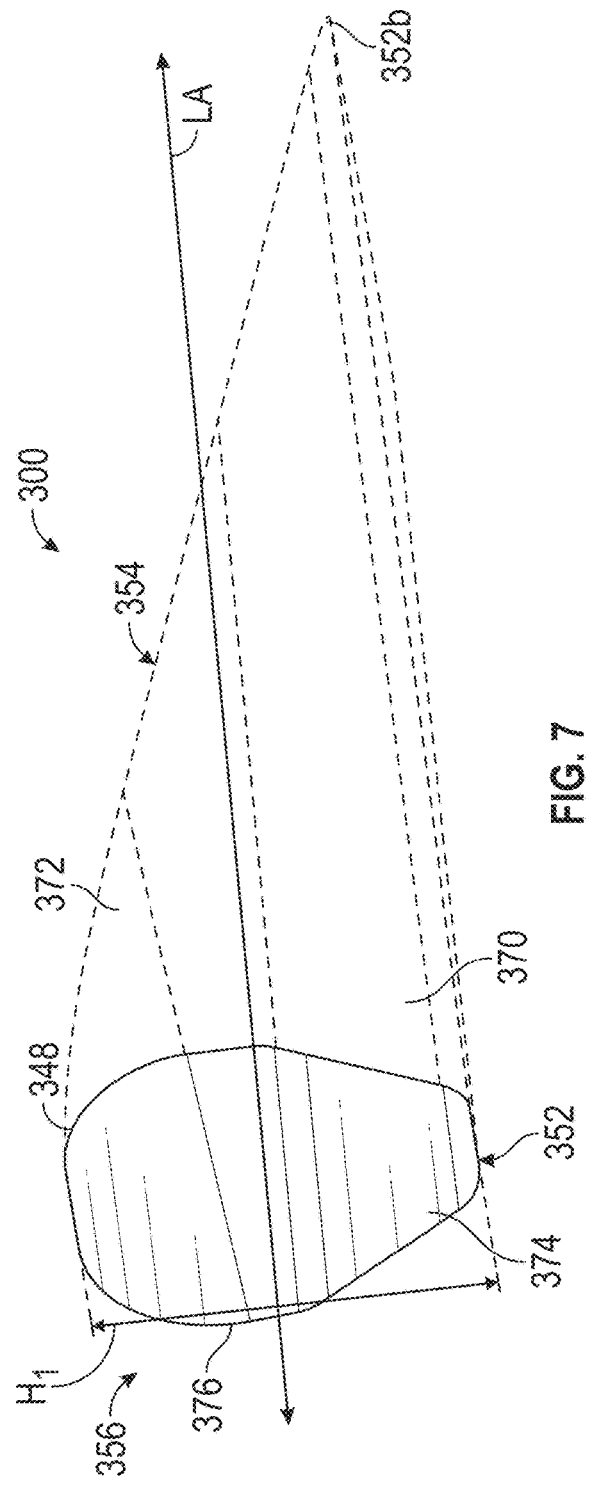
FIG. 7 is a perspective view of a cross-section of an outlet trough of the coating occlusion resistant effusion hole of FIG. 3, taken along a second plane transverse or normal to a longitudinal axis of the coating occlusion resistant effusion hole.

Referring back to FIG. 3, a second plane P2 is transverse or normal to the longitudinal axis LA and is taken through the outlet trough 346 downstream from the intersection of the rear wall 360 with the trough wall 352, and within the overhang portion 348. With reference to FIG. 7, a view of the cross-section of the effusion cooling hole 300 along the second plane P2 is shown. As shown in FIG. 7, the first section 370 of the first sidewall 354 and the third section 374 of the second sidewall 356 diverge away from each other and way from the trough wall 352 to form the divergent section 378 of the sidewalls 354, 356. The second section 372 of the first sidewall 354 and the fourth section 376 of the second sidewall 356 converge toward each other and toward the overhang portion 348 to form the convergent section 380 of the sidewalls 354, 356.

Figure 8:
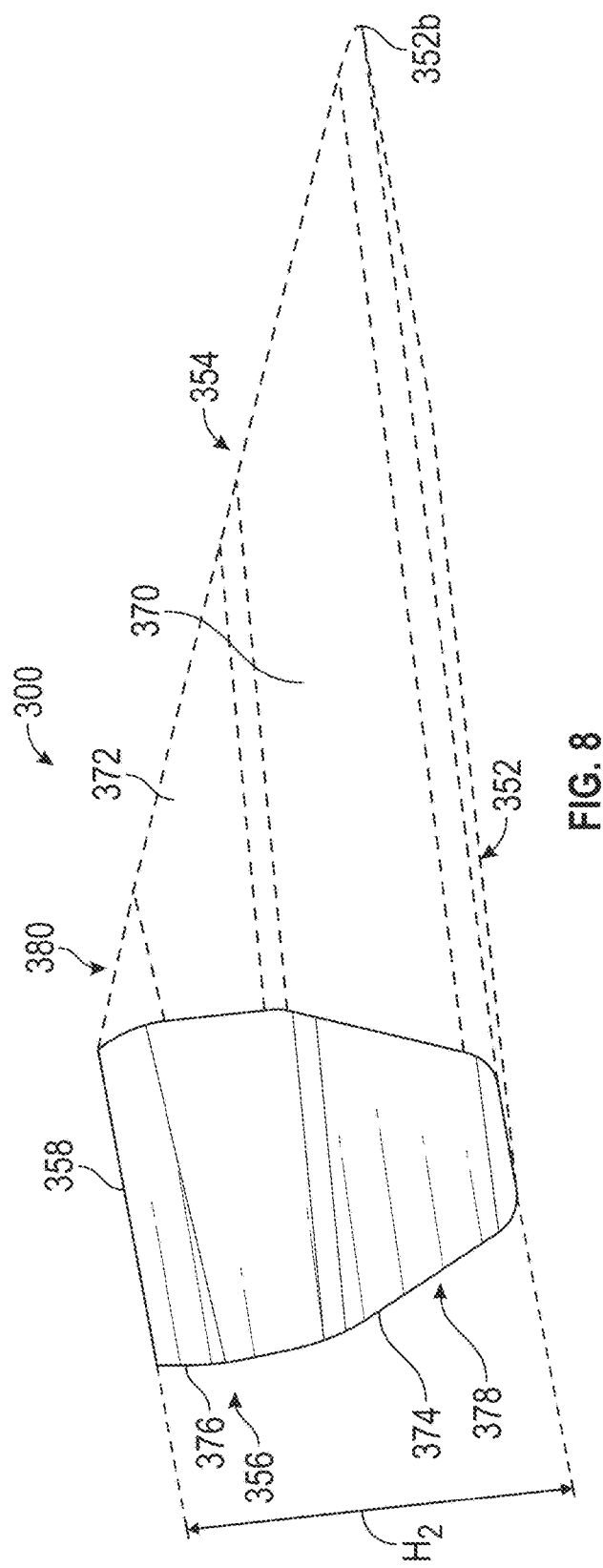
FIG. 8 is a perspective view of a cross-section of an outlet trough of the coating occlusion resistant effusion hole of FIG. 3, taken along a third plane transverse or normal to a longitudinal axis of the coating occlusion resistant effusion hole.

With brief reference back to FIG. 3, a third plane P3 is transverse or normal to the longitudinal axis LA and is taken through the outlet trough 346 downstream from the overhang portion 348. With reference to FIG. 8, a view of the cross-section of the effusion cooling hole 300 along the third plane P3 is shown. As shown in FIG. 8, the first section 370 of the first sidewall 354 and the third section 374 of the second sidewall 356 diverge away from each other and way from the trough wall 352 to form the divergent section 378 of the sidewalls 354, 356. The second section 372 of the first sidewall 354 and the fourth section 376 of the second sidewall 356 converge toward each other to form the convergent section 380 of the sidewalls 354, 356. As the third plane P3 is downstream of the overhang portion 348, the convergent section 380 terminates at the hot surface 306 such that the sidewalls 354, 356 are open at the hot surface 306.

Figure 9:
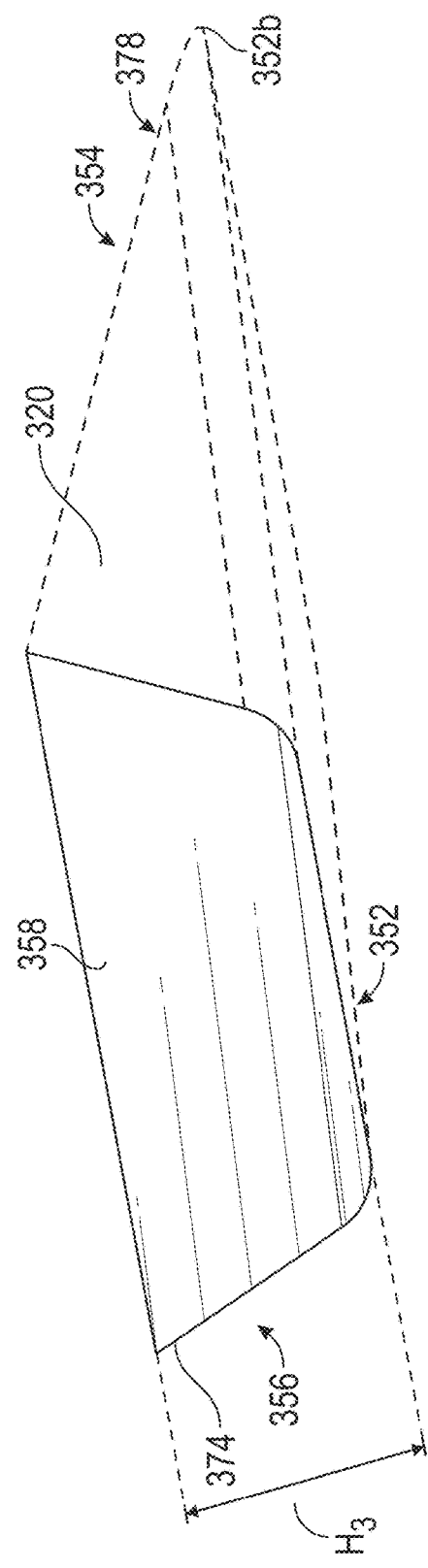
FIG. 9 is a perspective view of a cross-section of an outlet trough of the coating occlusion resistant effusion hole of FIG. 3, taken along a fourth plane transverse or normal to a longitudinal axis of the coating occlusion resistant effusion hole.

Referring back to FIG. 3, a fourth plane P4 is transverse or normal to the longitudinal axis LA and is taken through the outlet trough 346 downstream from the overhang portion 348. With reference to FIG. 9, a view of the cross-section of the effusion cooling hole 300 along the fourth plane P4 is shown. As shown in FIG. 9, the first section 370 of the first sidewall 354 and the third section 374 of the second sidewall 356 diverge away from each other and way from the trough wall 352 to form the divergent section 378 of the sidewalls 354, 356. As the fourth plane P4 is downstream of the overhang portion 348 and the outlet trough 346 extends at the angle $\beta$, the divergent section 378 terminates at the hot surface 306.

Thus, the sidewalls 354, 356 converge and diverge in a direction transverse or normal to the longitudinal axis LA along the outlet trough 346, with the convergent section 380 or the divergent section 378 terminating at the hot surface 306 as the outlet trough 346 extends at the angle $\beta$. In this example, given the angle $\beta$ of the trough wall 352, a height H of the sidewalls 354, 356 changes or decreases from the first end 352a to the second end 352b. In this regard, the height H of the sidewalls 354, 356 between the first end 352a (FIGS. 3 and 6) is different and greater than a height H1 of the sidewalls 354, 356 downstream of the first end 352a at the second plane P2 as shown in FIG. 7. The height H1 of the sidewalls 354, 356 downstream of the first end 352a, is different and greater than a height H2 of the sidewalls 354, 356 downstream of the first end 352a and downstream of the overhang portion 348 at the third plane P3 as shown in FIG. 8. The height H2 of the sidewalls 354, 356 is different and greater than a height H3 of the sidewalls 354, 356 proximate the second end 352b at the fourth plane P4 as shown in FIG. 9. The change or decrease in heights H-H3 of the sidewalls 354, 356 from the first end 352a to the second end 352b due to the angle $\beta$ of the outlet trough 346 results in the divergent section 378 of the sidewalls 354, 356 remaining downstream of the overhang portion 348 and proximate the second end 352b. Thus, proximate the second end 352b of the outlet section 318, the sidewalls 354, 356 diverge in a plane transverse or normal to the longitudinal axis LA.

As shown in FIG. 10, the outlet trough 346 of each of the effusion cooling holes 300 cooperates to form a film of cooling fluid over the hot surface 306 of the combustor liner 301. As shown, the outlet trough 346 is coated with the thermal barrier coating 302. With reference to FIG. 10A, the thermal barrier coating 302 substantially evenly covers the outlet trough 346, but due to the overhang portion 348, does not occlude the metering outlet 342 or outlet inlet 344. As shown in FIG. 10B, the divergence and the convergence of the sidewalls 354, 356 in the direction or in the plane transverse or normal to the longitudinal axis LA enables the pocket 362 to evenly receive and retain the thermal barrier coating 302 without occluding the metering outlet 342 and the outlet inlet 344 (FIG. 10A).

Generally, the effusion cooling hole 300 may be oriented in any suitable direction relative to local or mainstream air flows associated with the combustor liner 301. In one example, the combustor liner 301 is formed with a plurality of the effusion cooling holes 300 extending exterior to the cold surface 304 and the portion of the outlet section 318 extending through the wall 308 in a predetermined density and orientation to provide a predetermined amount of cooling for the combustor liner 301. In this example, the effusion cooling holes 300 and the combustor liner 301 are composed of a metal or metal alloy, including, but not limited to nickel or cobalt based alloys. The effusion cooling holes 300 and the combustor liner 301 are formed through additive manufacturing, including, but not limited to direct metal laser sintering (DMLS), laser powder bed fusion (L-PBF), electron powder bed fusion (E-PBF) or electron beam melting (EBM). In one example, the effusion cooling holes 300 and the combustor liner 301 are formed through additive manufacturing employing the method 500 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. The shape of the effusion cooling holes 300 enables the effusion cooling holes 300 to be self-supporting during formation through additive manufacturing.

With reference to FIG. 3, once the combustor liner 301 and the effusion cooling holes 300 are formed, the thermal barrier coating 302 may be applied to the hot surface 306 of the combustor liner 301. The thermal barrier coating 302 generally improves the heat resistance of the combustor liner 301 and the effusion cooling holes 300. In one example, the thermal barrier coating 302 comprises a bond coating layer 302a and a thermal barrier coating layer 302b, which comprise the bond coating layer 720 and the thermal barrier coating layer 730 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. Thus, the bond coating layer 302a may include an MCrAlY alloy, wherein M is at least one of cobalt and nickel. Such alloys typically include from about 10 to 35% chromium, 5 to 15% aluminum, and 0.01 to 1% yttrium, hafnium, or lanthanum. The thermal barrier coating layer 302b may include a layer of cubic yttria stabilized zirconia on the bond coating layer 302a. The layer of cubic yttria stabilized zirconia may include from about 7 to 40 mole % yttria and from about 60 to 93 mole % zirconia. The thermal barrier coating layer 302b, alternatively or additionally, may include a layer of cubic yttria stabilized hafnia disposed on the yttria stabilized zirconia layer or the bond coating layer 302a. The layer of cubic yttria stabilized hafnia and/or the layer of cubic yttria stabilized zirconia may have a columnar microstructure, and a plurality of segmentation gaps within the columnar microstructure.

In this example, the thermal barrier coating 302 is applied by plasma spray coating, but it should be appreciated that other techniques may be employed to apply the thermal barrier coating 302. In one example, the thermal barrier coating 302 has a thickness of about 0.017 inches, however, it should be understood that the thickness of the thermal barrier coating 302 may vary depending upon the application. The application of the thermal barrier coating 302 to the hot surface 306 may result in the thermal barrier coating 302 covering a portion of the outlet trough 338 as shown in FIG. 10. In one example, with reference to FIG. 3, a spray vector V1 for applying the thermal barrier coating 302 is substantially perpendicular to the hot surface 306. The length L2 of the outlet section 318 defined by the overhang portion 348 cooperates with the sidewalls 354, 356 to prohibit or prevent the thermal barrier coating 302 from plugging the effusion cooling holes 300 while ensuring adhesion of the thermal barrier coating 302 substantially evenly about the pocket 362 and the outlet inlet 344 (FIGS. 10A and 10B).

Thus, the effusion cooling holes 300 associated with the combustor liner 301 (which corresponds to either or both of the outer and inner combustor liners 210, 212) of the gas turbine engine 100 reduces plugging of the effusion cooling holes 300 with the thermal barrier coating 302 by forming the pocket 362 with the rear wall 360 and the sidewalls 354, 356 to receive the thermal barrier coating 302. The pocket 362 also ensures the substantially even adhesion of the thermal barrier coating 302 about the outlet inlet 344 (FIG. 10B). Further, by positioning the inlet section 310, the converging section 314, the metering section 316, and the portion of the outlet section 318 external to the wall 308 or outside of the thickness T of the wall 308, the thickness T of the wall 308 itself may be reduced, which reduces a weight of the combustor liner 301. The elliptical shape of the opening 324 of the inlet section 310 provides a larger flow capacity for the effusion cooling holes 300, and the ramp surface 312 encourages flow separation off of the cold surface 304 and into the respective one of the effusion cooling holes 300. In addition, forming the bellmouth 320 outside the thickness T of the wall 308 allows for enhanced heat transfer, which leads to a lower metal temperature of the combustor liner 301.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A coating occlusion resistant effusion cooling hole configured to form a film of a cooling fluid on a surface of a wall, the coating occlusion resistant effusion cooling hole extending along a longitudinal axis, and the coating occlusion resistant effusion cooling hole comprising:
    an inlet section defined so as to be spaced apart from the surface, the inlet section configured to receive the cooling fluid;
    a metering section fluidly coupled downstream of the inlet section; and
    an outlet section fluidly coupled downstream of the metering section, the outlet section configured to form the film of the cooling fluid on the surface, the outlet section including an overhang portion that extends along the surface, a recessed portion, a first sidewall and a second sidewall, the recessed portion includes a rear wall and a trough wall, the first sidewall and the second sidewall interconnect the overhang portion with the recessed portion along a portion of the outlet section, the first sidewall and the second sidewall converge and diverge in a plane defined proximate an intersection of the rear wall and the trough wall, the plane is transverse to the longitudinal axis, and each of the first sidewall and the second sidewall includes a divergent section that diverges away from the trough wall at a first angle of greater than 90 degrees, a convergent section that converges from the divergent section to the overhang portion in the plane and the convergent section includes a concave curve that curves toward the overhang portion.

2. The coating occlusion resistant effusion cooling hole of claim 1, wherein the longitudinal axis is at a second angle relative to the surface such that the overhang portion extends over the rear wall and a portion of the trough wall, and downstream of the overhang portion, the first sidewall and the second sidewall terminate at the surface.

3. The coating occlusion resistant effusion cooling hole of claim 2, wherein the outlet section includes an outlet inlet fluidly coupled to the metering section, an outlet trough that includes the overhang portion and the recessed portion, the overhang portion is positioned opposite the recessed portion proximate the metering section, the rear wall extends at a third angle away from the surface and the trough wall is connected to the rear wall at a first wall end and is connected to the surface at a second wall end.

4. The coating occlusion resistant effusion cooling hole of claim 3, wherein the trough wall diverges outwardly relative to the longitudinal axis from the first wall end to the second wall end.

5. The coating occlusion resistant effusion cooling hole of claim 3, wherein downstream of the overhang portion, a height of the first sidewall and the second sidewall changes such that proximate the second wall end, the first sidewall and the second sidewall diverge in the plane transverse to the longitudinal axis.

6. The coating occlusion resistant effusion cooling hole of claim 1, wherein the divergent section of each of the first sidewall and the second sidewall is proximate the recessed portion.

7. The coating occlusion resistant effusion cooling hole of claim 1, wherein in the plane transverse to the longitudinal axis, a height of the first sidewall and the second sidewall decreases from proximate the overhang portion to an end of the outlet section such that proximate the end of the outlet section, the first sidewall and the second sidewall diverge.

8. The coating occlusion resistant effusion cooling hole of claim 1, further comprising a ramp surface defined off of the wall and proximate the inlet section.

9. The coating occlusion resistant effusion cooling hole of claim 1, further comprising a thermal barrier coating on the outlet section.

10. The coating occlusion resistant effusion cooling hole of claim 9, wherein the first sidewall and the second sidewall cooperate with the recessed portion to define a pocket to receive the thermal barrier coating.

11. The coating occlusion resistant effusion cooling hole of claim 1, further comprising a converging section fluidly coupled downstream of the inlet section and fluidly coupled upstream from the metering section.

12. The coating occlusion resistant effusion cooling hole of claim 1, wherein the coating occlusion resistant effusion cooling hole is one of a plurality of coating occlusion resistant effusion cooling holes defined on a liner of a combustor for a gas turbine engine.

13. A combustor for a gas turbine engine, comprising:
a first liner having a first surface, a second surface opposite the first surface and a wall having a thickness defined between the first surface and the second surface;
a second liner forming a combustion chamber with the second surface of the first liner the combustion chamber configured to receive an air-fuel mixture for combustion;
the first liner defining a plurality of coating occlusion resistant effusion cooling holes configured to form a film of a cooling fluid on the second surface of the first liner, at least one of the plurality of coating occlusion resistant effusion cooling holes extending along a longitudinal axis and including:
an inlet section spaced apart from the first surface;
a converging section fluidly coupled downstream of the inlet section;
a metering section fluidly coupled downstream of the converging section, with the metering section, the converging section and the inlet section defined outside of the thickness of the wall; and
an outlet section fluidly coupled downstream of the metering section, the outlet section configured to form the film of cooling fluid on the second surface, the outlet section including an overhang portion that extends along the second surface, a recessed portion, a first sidewall and a second sidewall, the recessed portion includes a rear wall and a trough wall, the overhang portion extends over the rear wall and a portion of the trough wall, the first sidewall and the second sidewall interconnect the overhang portion with the recessed portion along a portion of the outlet section, the first sidewall and the second sidewall converge and diverge in a plane defined proximate an intersection of the rear wall and the trough wall, the plane is transverse to the longitudinal axis, and each of the first sidewall and the second sidewall includes a divergent section that diverges away from the trough wall at a first angle of greater than 90 degrees, a convergent section that converges from the divergent section to the overhang portion in the plane, and the convergent section includes a concave curve that curves toward the overhang portion.

14. The combustor of claim 13, wherein the inlet section further comprises an opening and a bellmouth that surrounds the opening, and the at least one of the plurality of coating occlusion resistant effusion cooling holes includes a ramp surface defined off of the wall and proximate the inlet section.

15. The combustor of claim 13, wherein the overhang portion extends for the portion of the outlet section, and downstream of the overhang portion, the first sidewall and the second sidewall terminate at the second surface.

16. The combustor of claim 15, wherein the outlet section includes an outlet inlet fluidly coupled to the metering section, an outlet trough that includes the overhang portion and the recessed portion, the overhang portion is positioned opposite the recessed portion proximate the metering section, the rear wall extends at a second angle away from the second surface and the trough wall is connected to the rear wall at a first wall end and is connected to the second surface at a second wall end, and the trough wall diverges outwardly relative to the longitudinal axis from the first wall end to the second wall end.

17. The combustor of claim 13, wherein the divergent section of each of the first sidewall and the second sidewall is proximate the recessed portion.

18. The combustor of claim 13, further comprising a thermal barrier coating on the second surface and the outlet section of the at least one of the plurality of coating occlusion resistant effusion cooling holes, wherein the first sidewall and the second sidewall cooperate with the recessed portion to define a pocket to receive the thermal barrier coating.

* * * * *